United States Patent [19]
Maruyama et al.

[11] Patent Number: 5,883,920
[45] Date of Patent: Mar. 16, 1999

[54] SPREAD SPECTRUM RECEIVING APPARATUS WITH BATTERY SAVING FUNCTION

[75] Inventors: Hidenori Maruyama; Hideho Tomita, both of Tokyo, Japan

[73] Assignee: NEC Corporation, Tokyo, Japan

[21] Appl. No.: 570,692

[22] Filed: Dec. 11, 1995

[30] Foreign Application Priority Data

Dec. 9, 1994 [JP] Japan ................................. 6-306470

[51] Int. Cl.⁶ .................................................. H04B 1/69
[52] U.S. Cl. ........................ 375/200; 375/326; 370/311; 455/229; 455/38.3
[58] Field of Search ..................... 375/200, 208, 375/209, 210, 326, 339, 343; 370/311, 320; 455/38.3, 343, 574, 229

[56] References Cited

U.S. PATENT DOCUMENTS 5,563,914 10/1996 Sogabe ..................................... 375/326
5,574,754 11/1996 Kurihara et al. ......................... 375/208
5,606,574 2/1997 Hasegawa et al. ...................... 375/200

FOREIGN PATENT DOCUMENTS

| 56-165425 | 12/1981 | Japan . |
| 57-196637 | 12/1982 | Japan . |
| 63-52547 | 3/1988 | Japan . |
| 1190054 | 7/1989 | Japan . |
| 1280931 | 11/1989 | Japan . |
| 1314039 | 12/1989 | Japan . |
| 2193416 | 7/1990 | Japan . |
| 2261226 | 10/1990 | Japan . |

Primary Examiner—Jason Chan
Assistant Examiner—Conguan Tran
Attorney, Agent, or Firm—Sughrue, Mion, Zinn, Macpeak & Seas, PLLC

[57] ABSTRACT

In a receiving apparatus for spread spectrum communications, a carrier detecting circuit for detecting a carrier in a spread spectrum modulated signal is intermittently operated in a standby mode.

11 Claims, 6 Drawing Sheets

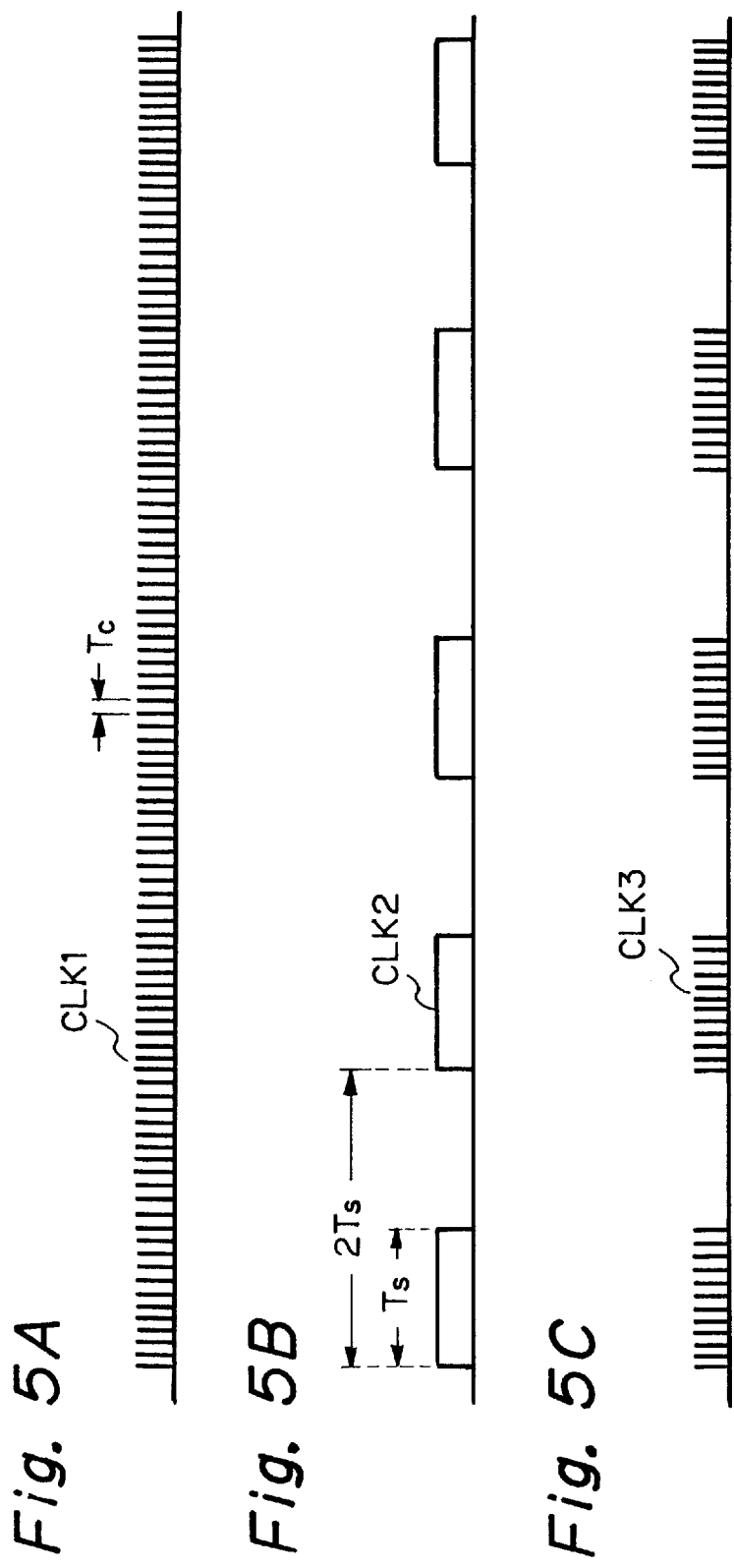

5,883,920

SPREAD SPECTRUM RECEIVING APPARATUS WITH BATTERY SAVING FUNCTION

BACKGROUND OF THE INVENTION

1. Field of the Invention

The present invention relates to a receiving apparatus for spread spectrum communications, and more particularly, to a spread spectrum receiving apparatus with a battery saving function used in mobile communications.

2. Description of the Related Art

In a spread spectrum communications system, a data signal is multiplied by a spread reference code, i.e., a unique pseudorandom noise (PN) code to spread the data signal. Then, the spread data signal is transmitted. On the other hand, in a spread spectrum receiving apparatus, a received signal is multiplied by the same spread reference code to demodulate the received signal. Since noise added to the received signal in a propagation path is spread by the demodulation, the spread spectrum communications system is characterized by its privacy and interference tolerance, and therefore, has been developed for mobile phones, wireless local area networks (LANs), and the like.

In a prior art spread spectrum receiving apparatus, a carrier detecting circuit for detecting a carrier in a spread spectrum modulated signal is continuously operated even in a standby mode. This will be explained later in detail.

However, particularly, when the above-described prior art spread spectrum receiving apparatus is applied to mobile communications, the power dissipation of a battery for driving the apparatus is remarkably increased.

SUMMARY OF THE INVENTION

It is an object of the present invention to reduce the power dissipation of a spread spectrum receiving apparatus.

According to the present invention, in a receiving apparatus for spread spectrum communications, a carrier detecting circuit for detecting a carrier in a spread spectrum modulated signal is intermittently operated in a standby mode. After a carrier is detected in the spread spectrum modulated signal, the control is transferred from the standby mode to a signal reception mode, so that the carrier detecting circuit is always operated.

Note that, if the carrier detecting circuit is intermittently operated in the standby mode, a preamble time period may be required to be extended. However, since a carrier can be detected by the present invention for 16 symbol time periods or so while one preamble is comprised of 100 symbol time periods or so, no problem occurs.

BRIEF DESCRIPTION OF THE DRAWINGS

The present invention will be more clearly understood from the description as set forth below, as compared with the prior art, with reference to the accompanying drawings, wherein:

FIGS. 5A, 5B and 5C are timing diagrams for explaining the operation of the clock signal control circuit of FIG. 4;

DESCRIPTION OF THE PREFERRED EMBODIMENTS

Before the description of the preferred embodiments, a prior art spread spectrum receiving apparatus will be explained with reference to FIGS. 1 and 2.

Figure 1:
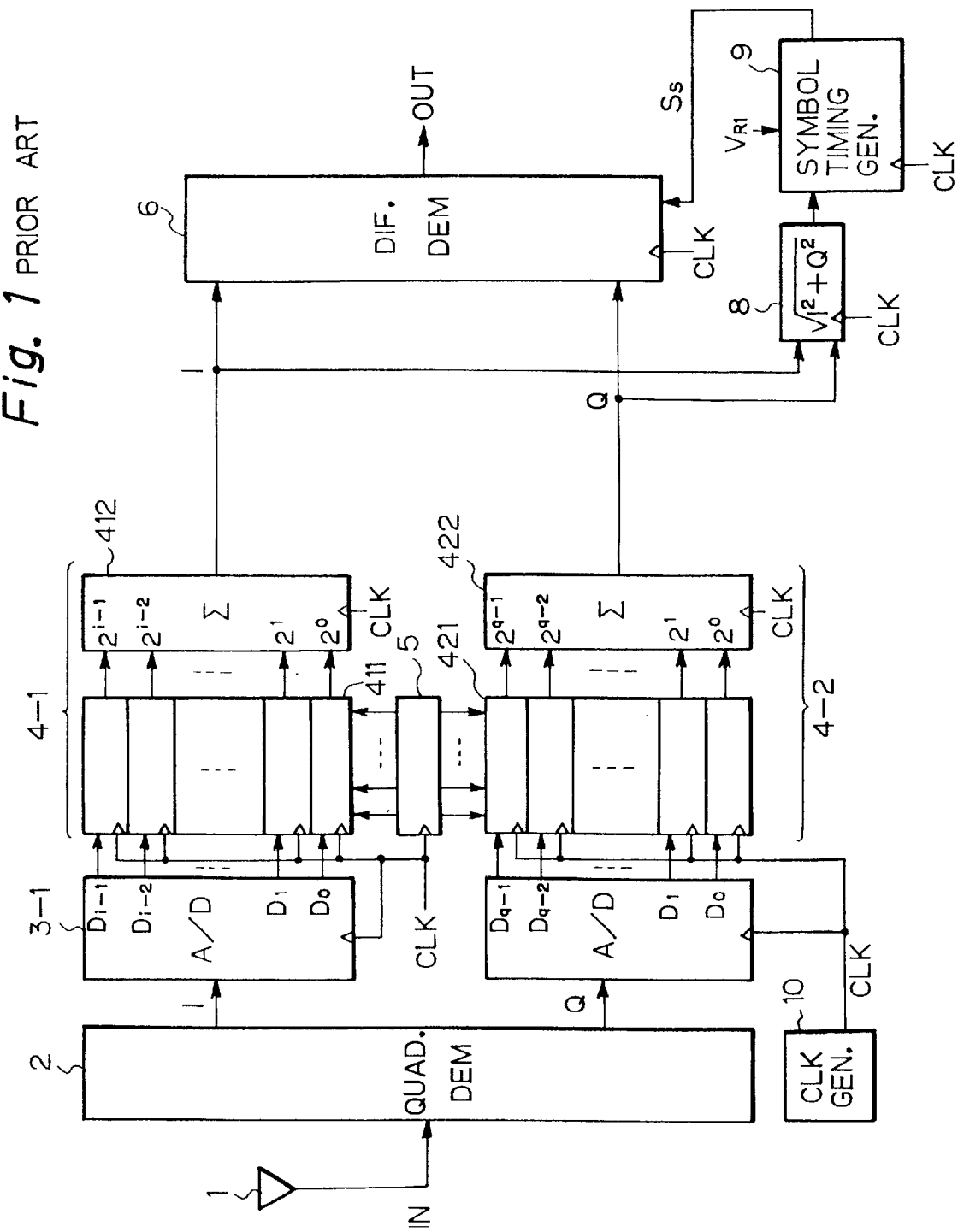
FIG. 1 is a block circuit diagram illustrating a prior art spread spectrum receiving apparatus.

In FIG. 1, reference numeral 2 designates a quadrature demodulator which demodulates a spread spectrum quadrature modulated signal IN from an antenna 1 to generate an in-phase component (I-channel) signal and a quadrature component (Q-channel) signal. An analog/digital (A/D) converter 3-1 performs an A/D conversion upon the I-channel signal to generate an i-bit digital signal. Similarly, an A/D converter 3-2 performs an A/D conversion upon the Q-channel signal to generate a q-bit digital signal.

The i-bit digital signal is supplied to a correlator circuit 4-1 formed by correlator elements 411 and a summing circuit 412. Each of the correlator elements 411 calculates a correlation between one bit of the i-bit digital signal and a spreading reference code signal generated from a spreading reference code generating circuit 5. The correlations are summed by the summing circuit 412 to generate an I data.

Similarly, the q-bit digital signal is supplied to a correlator circuit 4-2 formed by correlator elements 421 and a summing circuit 422. Each of the correlator elements 421 calculates a correlation between one bit of the q-bit digital signal and the spreading reference code signal generated from the spreading reference code generating circuit 5. The correlations are summed by the summing circuit 422 to generate a Q data.

The I data and the Q data are supplied to a differential demodulator or a data demodulator 6 which demodulates the I data and the Q data and generates a data signal OUT in response to a symbol timing signal $S_S$ which is generated at every period of the spreading reference signal.

The symbol timing signal $S_S$ is generated by an amplitude calculating circuit 8, and a symbol timing generating circuit 9. That is, the amplitude calculating circuit 8 calculates:

$$\sqrt{I^2 + Q^2}$$

Then, the symbol timing generating circuit 9 selects a maximum value MAX of amplitudes over a symbol time period, and determines whether or not MAX>$V_{R1}$ (definite value)

As a result, only when MAX>$V_{R1}$, does the symbol timing generating circuit 9 generate the symbol timing signal $S_S$ whose time period is called a symbol time period $T_S$.

The elements 3-1, 3-2, 4-1, 4-2, 5, 6, 8 and 9 are clocked by a system clock signal CLK from a clock signal generating circuit 10. The time period of the system clock signal CLK is called a chip time period smaller than the symbol time period $T_S$.

Figure 2:
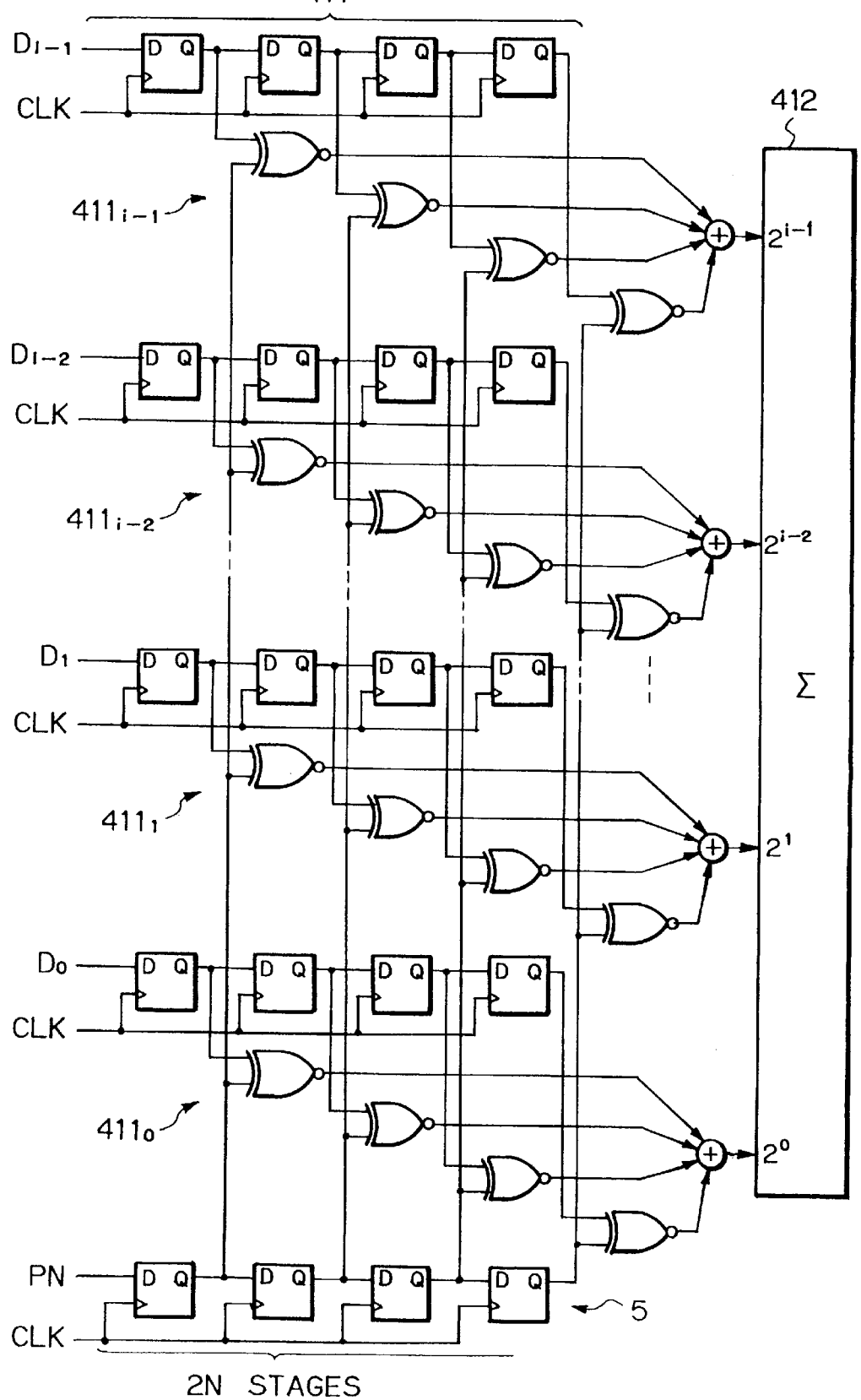
FIG. 2 is a circuit diagram of the correlator circuit and the spread reference code generating circuit of FIG. 1.

In FIG. 2, which is a detailed circuit diagram of the correlator elements 411, ($411_0$, $411_1$, ..., $411_{i-2}$, $411_{i-1}$), the summing circuit 412 and the spread reference code generating circuit 5 of FIG. 1, if the outputs $D_0, D_1, \ldots, D_{i-2}$ and $D_{i-1}$ of the A/D converter 3-1 are sampled by twice over sampling processing, and the number of bits the spread reference code signal is N, each of the correlator elements $411_0, 411_1, \ldots, 411_{i-2}$ and $411_{i-1}$ is formed by 2N-stage D-type flip-flops, 2N-stage exclusive NOR circuits, and an adder. Note that PN designates a unique pseudorandom noise code.

The correlator elements 421 have a similar configuration as the correlator elements 411.

Therefore, the greater the number of bits of the outputs of the A/D converters 3-1 and 3-2, the greater the power dissipation. Also, the greater the number of bits of the spread reference code signal, the greater the power dissipation.

Also, returning to FIG. 1, since the data demodulator 6 is clocked even in a standby mode, where a carrier is not found, the power dissipation is also increased.

Note that, in a non-spread spectrum receiving apparatus, the operation of most of the parts of the receiving apparatus can be stopped in a standby mode. However, in the spread spectrum receiving apparatus of FIG. 1, after a carrier is found by operating the correlator elements and the like in a standby mode, the control is transferred from the standby mode to a signal reception mode. Therefore, it is impossible to stop the operation of even a part of the spread spectrum receiving apparatus of FIG. 1 in a standby mode. Thus, since the power dissipation of the spread spectrum receiving apparatus of FIG. 1 is too large, it is hardly possible to apply it to mobile communications.

Figure 3:
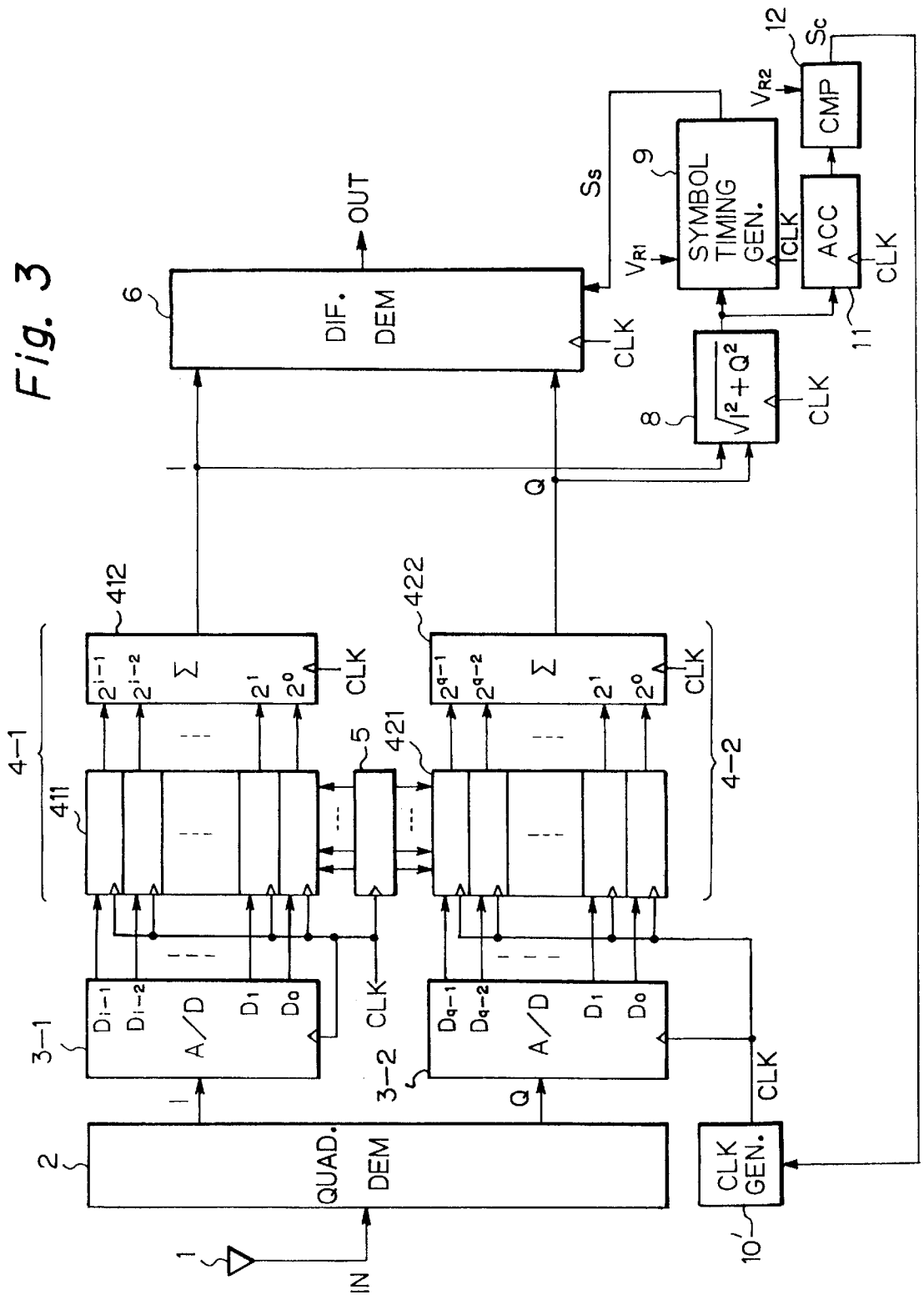
FIG. 3 is a block circuit diagram illustrating an embodiment of the spread spectrum receiving apparatus according to the present invention.

In FIG. 3, which illustrates an embodiment of the present invention, an accumulator 11 and a comparator 12 are added to the elements of FIG. 1, and the clock signal generating circuit 10 of FIG. 1 is modified into a clock signal control circuit 10'. The accumulator 11 accumulates the amplitude value of the amplitude value calculating circuit 8 over a symbol time period, and the comparator 12 compares an accumulated value of the accumulator 11 with a definite value $V_{R2}$. That is, the accumulator 11 and the comparator 12 serve as a carrier detecting means.

Figure 4:
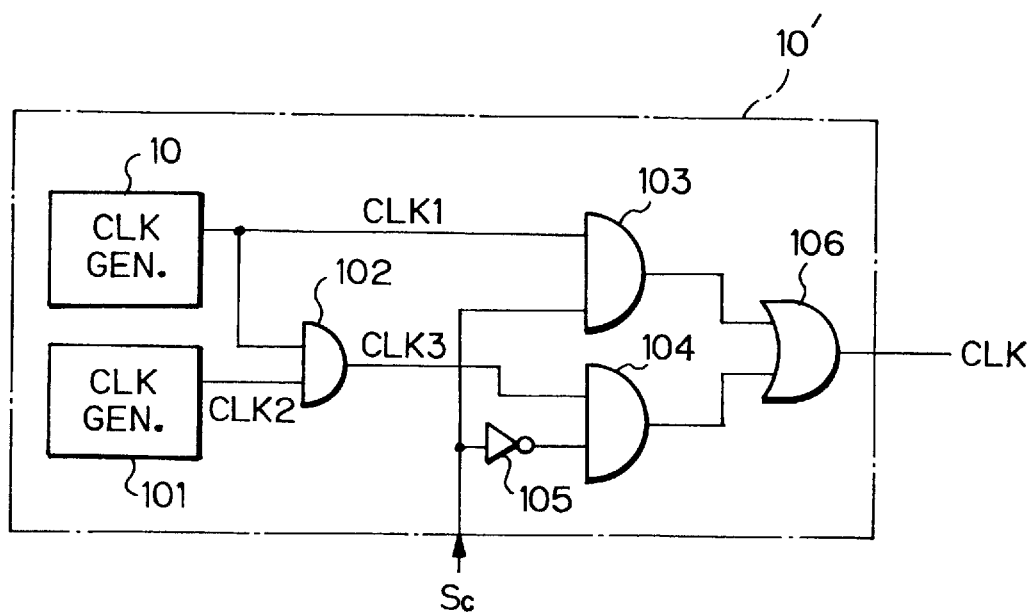
FIG. 4 is a circuit diagram of the clock signal control circuit of FIG. 3.

In FIG. 4, which is a detailed circuit diagram of the clock signal control circuit 10' of FIG. 3, the clock signal control circuit 10' includes a clock signal generating circuit 101, AND circuits 102, 103 and 104, an inverter 105, and an OR circuit 106 in addition to the clock signal generating circuit 10. In this case, the clock signal generating circuit 10 generates a clock signal CLK1 whose time period is relatively small and is a chip time period $T_C$ as shown in FIG. 5A. On the other hand, the clock signal generating circuit 101 generates a clock signal CLK2 whose time period is relatively long and is twice a symbol time period $T_S$ as shown in FIG. 5B. As a result, the AND circuit 102 generates a clock signal CLK3 as shown in FIG. 5C. One of the clock signals CLK1 and CLK3 is selected by the AND circuits 103 and 104, the inverter 105 and the OR circuit 106 and is transmitted therefrom as the system clock signal CLK.

In a standby mode where the output signal $S_C$ of the comparator 12 is low, the AND circuit 103 is disabled and the AND circuit 104 is enabled. As a result, the elements 3-1, 3-2, 4-1, 4-2, 5, 6, 8, 9 and 10 are clocked by the clock signal CLK3, and therefore, are intermittently operated. In this standby state, when a carrier is detected so that the accumulated value is larger than the definite value $V_{R2}$, the output signal $S_C$ of the comparator 12 becomes high, so that the AND circuit 103 is enabled and the AND circuit 104 is disabled. As a result, the elements 3-1, 3-2, 4-1, 4-2, 5, 6, 8, 9 and 10 are clocked by the clock signal CLK1, and therefore, are continuously operated.

Figure 6:
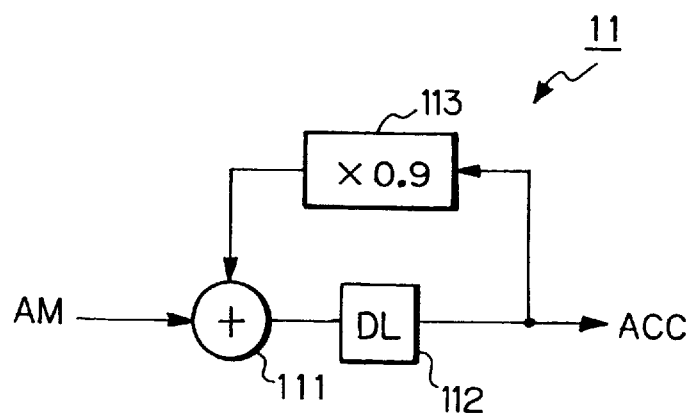
FIG. 6 is a circuit diagram of the accumulator circuit of FIG. 3.

In FIG. 6, which is a detailed circuit diagram of the accumulator 11 of FIG. 3, a leakage value such as 0.1×ACC (ACC: accumulated value) is subtracted from the accumulated value ACC, i.e. 0.9×ACC is calculated at every symbol time $T_S$ and an amplitude value AM is added thereto, to prevent the accumulated value ACC from overflowing. For this purpose, an adder 111, a delay circuit 112 having a delay time of the symbol time period $T_S$ and a multiplier 113 are provided.

Figure 7:
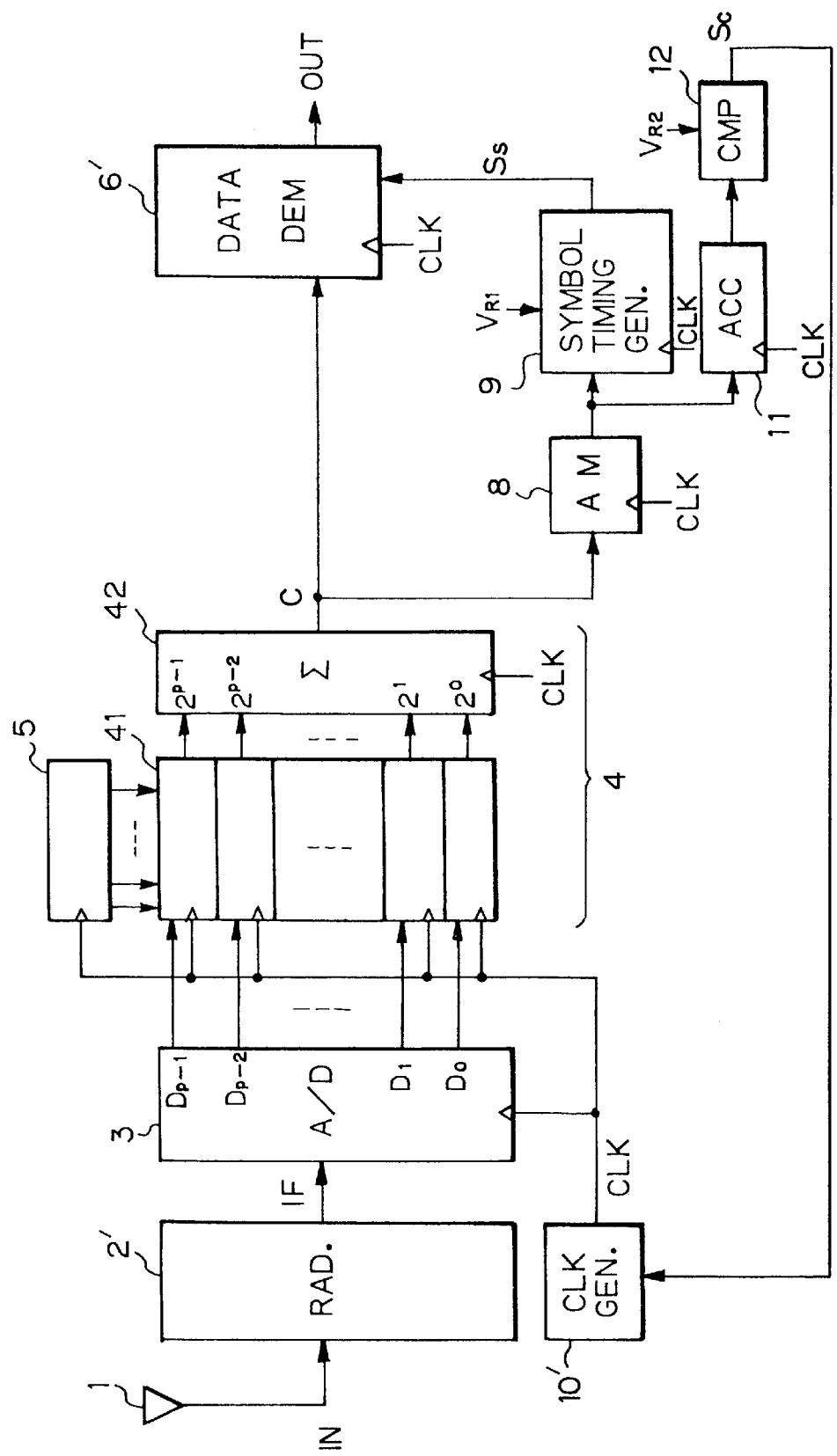
FIG. 7 is a block circuit diagram illustrating another embodiment of the spread spectrum receiving apparatus according to the present invention.

In FIG. 7, which illustrates another embodiment of the present invention, a spread spectrum non-orthogonally modulated signal IN is received by the antenna 1, and an intermediate frequency (IF) component is extracted by a wireless portion 2' from the signal IN. An A/D converter 3 performs an A/D conversion upon the IF signal to generate a p-bit digital signal.

The p-bit digital signal is supplied to a correlator circuit 4 formed by correlator elements 41 and a summing circuit 42. Each of the correlator elements 41 calculates a correlation between one bit of the p-bit digital signal and a spreading reference code signal generated from a spreading reference code generating circuit 5. The correlations are summed by the summing circuit 42 to generate a correlation data C.

The correlation data C are supplied to a data demodulator 6' which demodulates the correlation data C and generates a data signal OUT in response to a symbol timing signal $S_S$.

The symbol timing signal $T_S$ is generated by an amplitude calculating circuit 8, and a symbol timing generating circuit 9. That is, the amplitude calculating circuit 8 calculates:

$$|C|$$

Then, the symbol timing generating circuit 9 selects a maxium value MAX of amplitudes over a symbol time period $T_S$ and determines whether or not $$MAX > V_{R1}$$

As a result, only when $MAX > V_{R1}$, does the symbol timing generating circuit 9 generate the symbol timing signal $S_S$ whose time period is called the symbol time period $T_S$.

Also, an accumulator 11 accumulates the amplitude value of the amplitude value calculating circuit 8 over a symbol time period, and the comparator 12 compares an accumulated value of the accumulator 11 with a definite value $V_{R2}$. That is, also in this case, the accumulator 11 and the comparator 12 serve as a carrier detecting means.

Also, in FIG. 7, in a standby mode where the output signal $S_C$ of the comparator 12 is low, the AND circuit 103 is disabled and the AND circuit 104 is enabled. As a result, the elements 3, 4, 5, 6', 8, 9 and 11 are clocked by the clock signal CLK3, and therefore, are intermittently operated. In this standby state, when a carrier is detected so that the accumulated value is larger than the definite value $V_{R2}$, the output signal $S_C$ of the comparator 12 becomes high, so that the AND circuit 103 is enabled and the AND circuit 104 is disabled. As a result, the elements 3, 4, 5, 6', 8, 9 and 11 are clocked by the clock signal CLK1, and are continuously operated.

In FIGS. 3 and 7, the operation of the data demodulators 6 and 6' can be completely stopped in a standby mode, thus further reducing the power dissipation.

As explained hereinbefore, according to the present invention, since the circuits for detecting a carrier are intermittently operated in a standby mode, the power dissipation can be reduced, particularly, in a wireless local area network (LAN) system where a standby state frequently occurs.

We claim:

1. A receiving apparatus for spread spectrum communications comprising:
   a carrier detecting means for detecting a carrier in a spread spectrum modulated signal; and
   an operating means for intermittently operating said carrier detecting means in a standby mode;
   wherein said operating means comprises a means for intermittently generating a system clock signal and transmitting said system clock signal to said carrier detecting means; and
   wherein said system clock signal generating means generates said system clock signal alternately for every symbol time period of a preamble of a period of said spread spectrum modulated signal, said symbol time period being larger than a time period of said symbol clock signal.

2. An apparatus as set forth in claim 1, wherein said carrier detecting means comprises a means for determining whether or not an amplitude of said spread spectrum modulated signal is larger than a definite value.

3. A receiving apparatus for spread spectrum communications comprising:
   means for receiving a spread spectrum modulated signal to generate a plurality of bit signals;
   a plurality of correlator elements each for calculating a correlation value between one of said bit signals and spreading reference code;
   means for summing said correlation values to generate a summed signal;
   means for detecting a presence of a carrier in said spread spectrum modulated signal in accordance with said summed signal;
   means for operating said correlator elements by using a system clock signal;
   a continuous system clock signal generating means for continuously generating said system clock signal in response to the presence of said carrier being detected in said spread spectrum modulated signal; and
   an intermittent system clock signal generating means for intermittently generating said system clock signal when the presence of said carrier is not found in said spread spectrum modulated signal.

4. An apparatus as set forth in claim 3, wherein spread spectrum modulated signal receiving means comprises:
   a filter means for extracting an IF component from said spread spectrum modulated signal; and
   an A/D converter, connected to said filter means, for performing an A/D conversion upon said IF component to generate said plurality of bit signals,
   said A/D converter being operated by said system clock signal.

5. An apparatus as set forth in claim 3, wherein said carrier detecting means comprises:
   means for accumulating an absolute value over a symbol time period larger than a time period of said system clock signal; and
   means for determining whether or not an accumulated value of said accumulating means is larger than a first definite value, thus detecting said carrier when said accumulated value is larger than said first definite value,
   said accumulating means and said determining means being operated by said system clock signal.

6. An apparatus as set forth in claim 5, wherein said accumulating means comprises:
   means for subtracting a leakage value smaller than said accumulated value from said accumulated value at every time period of said system clock signal; and
   means for adding said absolute value to said accumulated value when said symbol time period passes after said leakage value is subtracted from said accumulated value,
   said subtracting means and said adding means being operated by said system clock signal.

7. An apparatus as set forth in claim 3, further comprising:
   means for caluculating an absolute value of said summed signal;
   means for detecting a symbol timing when said absolute value is larger than a second definite value; and
   means for demodulating said summed signal into data when said symbol timing is detected,
   said demodulating means being operated by said system clock signal.

8. A receiving apparatus for spread spectrum communications comprising:
   a quadrature demodulator for demodulating a spread spectrum quadrature modulated signal to generate an I-channel signal and a Q-channel signal;
   a first A/D converter, connected to said quadrature demodulator, for performing an A/D conversion upon said I-channel signal to generate an i-bit digital I-channel signal;
   a second A/D converter, connected to said quadrature demodulator, for performing an A/D conversion upon said Q-channel signal to generate a q-bit digital Q-channel signal;
   a plurality of first correlator elements, connected to said first A/D converter, for calculating first correlation values between said i-bit digital I-channel signal and a spreading reference code signal;
   a first summing means, for summing said first correlation values;
   a plurality of second correlator elements, connected to said second A/D converter, for calculating second correlation values between said q-bit digital Q-channel signal and said spreading reference code signal;
   a second summing means, for summing said second correlation values;
   an amplitude calculating means, for calculating an amplitude value defined by summed values of said first and second summing means;
   an accumulating means for accumulating said amplitude value over a symbol time period larger than a time period of a system clock signal;
   a determining means for determining whether an accumulated value of said accumulating means is larger than a first definite value;
   means for operating said first and second A/D converters, said first and second correlator elements, said first and second summing means, said accumulating means and said determining means by using a system clock signal;
   a continuous system clock signal generating means for continuously generating said system clock signal when said accumulated value is larger than said first definite value; and an intermittent system clock signal generating means for intermittently generating said system clock signal when said accumulated value is not larger than said first definite value.

9. An apparatus as set forth in claim 8, wherein said accumulating means comprises:

means for subtracting a leakage value smaller than said accumulated value from said accumulated value at every time period of said system clock signal; and means for adding said amplitude value to said accumulated value after said leakage value is subtracted form said accumulated value, said subtracting means and said adding means being operated by said system clock signal.

10. An apparatus as set forth in claim 8, further comprising a data demodulating means for demodulating said summed values to generate data, said data demodulating means being operated by said system clock signal.

11. An apparatus as set forth in claim 10, further comprising:

means for determining whether or not said amplitude value is larger than a second definite value said data demodulating means being operated in response to a timing when said amplitude value is larger than said second definite value.

* * * * *